United States Patent [19]

Glaser

[11] 4,053,874

[45] Oct. 11, 1977

[54] APPARATUS FOR MONITORING THE LIQUID LEVEL IN A TANK

[75] Inventor: Helmut Glaser, Forchheim, Germany

[73] Assignee: Siemens Aktiengesellschaft, Berlin & Munich, Germany

[21] Appl. No.: 661,428

[22] Filed: Feb. 26, 1976

[30] Foreign Application Priority Data

Mar. 10, 1975 Germany .............................. 2510356

[51] Int. Cl.² ............................................ G08B 21/00
[52] U.S. Cl. .................................. 340/244 R; 73/295; 307/118; 361/178; 340/214
[58] Field of Search ............... 340/244 R, 244 C, 285, 340/214; 323/75 N, 75 H; 324/DIG. 1; 307/118; 317/DIG. 3; 73/290 R, 295; 361/178

[56] References Cited

U.S. PATENT DOCUMENTS

| 3,898,554 | 8/1975 | Knudsen | 323/75 H |
| 3,922,658 | 11/1975 | Harper et al. | 340/244 R |

Primary Examiner—John W. Caldwell
Assistant Examiner—Daniel Myer
Attorney, Agent, or Firm—Kenyon & Kenyon, Reilly, Carr & Chapin

[57] ABSTRACT

In apparatus for monitoring the liquid level in a tank which includes a resistance bridge supplied with d-c current having two bridge arms arranged inside the tank, one of which is electrically heated, with the output of the resistance bridge followed by a signal stage with a binary indication and by a current regulator for the heating current, and a testing arrangement for simulating a given filling level, the resistance bridge is supplied from a constant current source whose current is switched from one current value to another upon the operation of the testing device in order to preclude operating disturbances during the testing.

9 Claims, 3 Drawing Figures

APPARATUS FOR MONITORING THE LIQUID LEVEL IN A TANK

BACKGROUND OF THE INVENTION

The invention relates to apparatus for monitoring the liquid level in a tank with a resistance bridge supplied with d-c current in general, and more particularly to an improved arrangement to prevent disturbances when testing such apparatus.

Apparatus of this general nature, also called an electrical level sensor, is known from "Siemens-Zeitschrift" 42 (1968), pages 746 to 748. With such level sensors, the water level in steam boilers and condensers of steam power plants is monitored and a warning signal is given if the level exceeds or falls below a predetermined value. The output voltage of the resistance bridge with two arms inside the tank, one of which is heated, is used to provide the warning signal. The fact that the bridge arms if immersed in the liquid, e.g., water, will be at approximately the same temperature even though the one bridge arm is heated, while in a steam atmosphere the bridge arm inside the tank will have different temperatures because of the heating is used as a basis for evaluation. In the latter state, the bridge is therefore unbalanced. Where water is the cooling liquid, the fact that, with increasing pressure, the density difference and, therefore, the temperature difference between steam and water becomes smaller and smaller until it becomes zero at the critical pressure must also be considered. This also means that the heat transfer between steam and water is equal at the critical pressure. In order to compensate for this decrease of the temperature difference with increasing pressure, the bridge output voltage must therefore be regulated to a constant value by means of the current regulator. If both bridge arms are in the steam atmosphere the heating current must be limited in order to avoid overheating if the density of the steam atmosphere is too low. In order to test the operability of the level sensor during operation, a testing arrangement is provided in which the bridge is unbalanced by shunting resistors across it and thereby simulating a given filling level. In the prior art apparatus the length of the connecting line between the resistance bridge and the evaluating device influences the measurement value, so that an adjustment at the installation site is always necessary. In addition, the testing arrangement does not determine whether the sensor formed with the resistors is functioning properly. With the prior art device, difficulties are therefore encountered not only in the installation, but also because it does not always operate in a fully reliable manner.

Thus, there is a need for improved apparatus of the general type mentioned above which is easy to install and which has full operational reliability.

SUMMARY OF THE INVENTION

According to the present invention, this problem is solved by supplying the resistance bridge from a constant current source which permits two currents of different magnitude to be impressed, and in which switching from one current to the other can be accomplished by a switching device that can be operated by the testing device.

Because of the supply from a constant current source, the measurement value becomes independent of the length and therefore, the resistance of the connecting lines. Special adjustments or calibration in each separate installation is therefore not necessary. This facilitates the installation process substantially. In addition, by testing the operability by switching current with the testing device, the operation of the sensors is checked in addition to checking of the measuring and evaluating circuit. High operational reliability is thereby provided.

In accordance with a further feature of the present invention, the current regulator may be preceded by an analog storage device. The connection between the output of the resistance bridge and the current regulator is interrupted when the testing device is operated. Thereby, the heating current is kept at a constant value during the operation of the testing device; this value is preset by the analog storage device. Overheating of the sensor if the test signal is present for a long time is thereby precluded.

The signal stage is preferably connected with an external readout device, which is disconnected when the testing device is operated. This insures that the filling level simulated for the test gives only an internal and not an external indication, thereby precluding false indications.

Preferably, a detector for determining the bridge supply voltage which is connected through a limit indicator to a warning device is included along with a detector for determining the heating current which is also connected to the warning device through a limit indicator. This permits the break of a heater helix or a measuring helix to also be indicated during operation.

BRIEF DESCRIPTION OF THE PREFERRED EMBODIMENT

Figure 1:
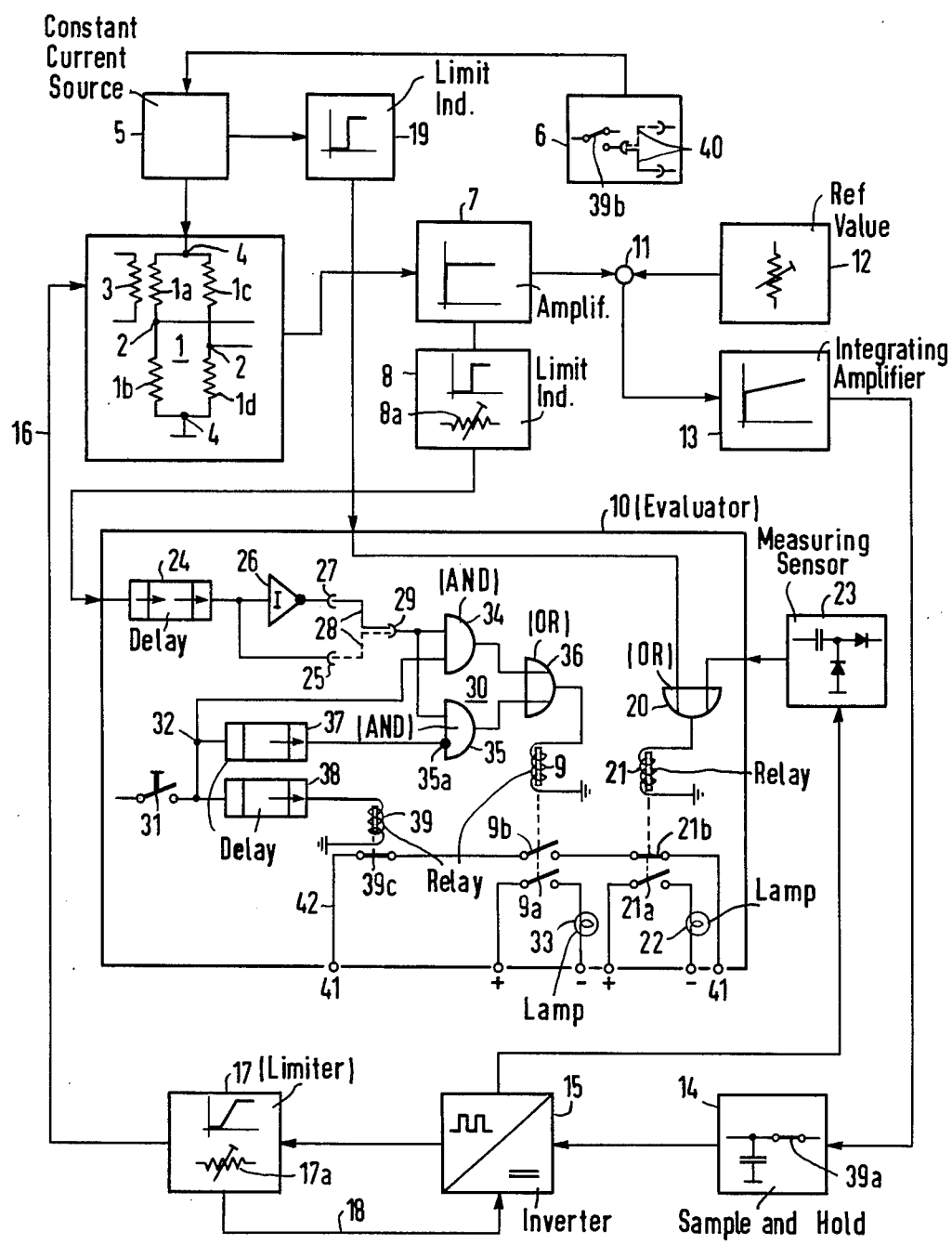
FIG. 1 is a block diagram of the apparatus according to the invention.

The block diagram of FIG. 1 shows a resistance bridge 1, made up of four resistors 1a to 1d. The resistances of the resistors 1a to 1d are chosen so that for equal temperature of all resistors, a bridge output voltage $U_{Br} = 0$ appears at the output 2 of the bridge, i.e., the resistance bridge 1 is balanced. The resistors 1a and 1b of the resistance bridge 1 are arranged inside a tank, the filling level of which is to be monitored. This tank is not shown in the figure in order to preserve clarity. One of these two resistors, the resistor 1a in FIG. 1, can be heated electrically by a heating resistor 3. Regarding the mechanical design of the resistors 1a and 1b acting as sensors and the heater helix 3 for the resistor 1a, reference is made to the above mentioned literature reference.

The measuring bridge 1 is supplied from a constant current source 5 through the inputs 4 of the bridge 1. Two currents of different magnitude can be impressed on the bridge with the constant current source 5; switching from one current to the other is possible by means a switching device 6, which will be explained in detail below.

The output 2 of the resistance bridge 1 is connected to proportional amplifier 7. The amplifier 7 is followed by a limit indicator 8 which has a response threshold adjustable by means of the resistor 8a. The output of the limit indicator 8 is fed to a signal stage in the form of a relay coil 9 in an evaluator 10 which will be described in detail below.

In the control circuit for the heater current, a summing junction 11 is connected to a second output of the amplifier 7, which provides an actual value input and to a reference value transmitter 12 e.g., a potentiometer. The summing junction 11 is followed by a proportional integrating amplifier 13, which is connected through an analog storage device 14 e.g. a sample and hold circuit, to the control unit of an inverter 15 used as a switching controller. The inverter feeds the heating resistor 3 with a-c current in pulse fashion over a line 1b. For the switching controller used in the present embodiment, the duty cycle of the heating current is varied as a function of the control signal supplied by the control unit of the inverter 15 e.g. integrating amplifier 13, and the heating current for the heater helix 3 of the measuring sensor 1a is thereby controlled. The heating current is limited to a maximum value by a limiter 17. The maximum value can be set by means of a resistor 17a. To accomplish this the limiter 17, via the line 8, reduces the control signal at inverter 15 if the heating current increases.

The measuring and control amplifiers 7, 8 and 13 and the evaluator 10 are supplied with a supply voltage which has only one polarity to ground and is, for instance, positive, from a voltage regulator, not shown. This prevents an unintended, false signal from getting to the outside if a power supply bus fails. Further advantages of using a supply with a single supply voltage will be pointed out separately later.

The bridge supply voltage $U_{sp}$ across the contant-current source 5 is measured with a detector, not shown. The bridge supply voltage rises up to a maximum value if a break of the measuring helix occurs. The detector is followed by a limit indicator 19, which is connected, in the evaluator 10, through a digital logic member, in the embodiment of FIG. 1 an OR gate 20, with an alarm device in the form of a relay 21 in the embodiment of FIG. 1. If a break of a measuring helix occurs in one of the measuring resistors 1a to 1d, then a logical "1" signal is present at the input of OR gate 20 and the relay 21 energizes closing contact 21a to an internal signal transmitter, e.g., a lamp 22.

A further measuring sensor 23 ascertains whether heater current is flowing or whether the heater current has been interrupted because of a break of the heater helix in the resistor 3. In the embodiment of FIG. 1, the measuring sensor 23 is a frequency to voltage converter, which will indicate that the switching controller or the inverter 15 is no longer cycling when the load is missing, i.e., in the event of a break of the heater helix. To do this, the clock frequency of the inverter 15 is capacitively coupled to the sensor 23 and is rectified. If the clock frequency fails, the average d-c value is absent and the measuring sensor 23 applies a logical "1" signal to the second input of the digital logic member, i.e. OR gate 20. This signal also causes the relay 21 to respond and thereby indicates a break in the heater helix. The measuring helix break alarm as well as the heater helix break alarm given by the alarm device 21 increases the operational reliability of the level monitor substantially.

In the evaluator 10, the signal from the limit indicator 8 is fed through a delay member 24 directly to a terminal 25 and through an inverter 26 to a terminal 27. By insertion of a jumper 28, either the terminal 27 or the terminal 25 is connected with an input terminal 29 of a logic circuit 30, which consists of digital logic members. By means of the jumper 28, measuring criterion can be set for detecting whether the sensor is in a steam atmosphere or in a liquid. The logic circuit 30 is designed so that a logical "1" signal is fed to the relay 9 if a logical "1" signal is present at the terminal 29, i.e., the measuring criterion is fulfilled, if a testing device 31, a test button in the embodiment of FIG. 1, is not operated and thus a logical "0" signal is present at the second input 32 of the logic circuit 30. With the logical "1" signal fed to the signal stage, the relay 9 is operated and the supply circuit for a second internal signal transmitter, e.g., a lamp 33, is closed by the contact 9a.

In the embodiment of FIG. 1, the logic circuit 30 is constructed of two AND gates 34 and 35 and one OR gate 36. One input of the AND gate 34 is connected to the terminal 29 and the second input to the test button 31. The AND gate 35 has an inverted input 35a which is connected to the test button 31 through a delay member 37. The second input of the AND gate 35 is connected to the terminal 29. The outputs of the AND gates 34 and 35 are the inputs to OR gate 36, the output of which is connected to the relay 9.

The test button 31 is connected to a relay 39 through a third delay member 38. A normally closed contact 39a of the relay 39 connects the analog value storage device 14 with the amplifier 13. Another set of contacts 39b in the switching device 6 permit switching from one current value of the constant current source 5 to another. In the switching device 6, a jumper is again provided, to set up the desired measuring criterium i.e. "Sensor in Steam Atmosphere" or "Sensor in Liquid" for testing the apparatus upon operating the test button 31. The testing device and the delay members 24, 37 and 38 will be discussed in detail below.

An external output for the evaluator 10 is provided at the terminals 41. This external indication is designed as a "secure circuit" which is opened upon operation of the test button 31 as well as when the alarm device 21 responds, so as to prevent a false external alarm. For this purpose, a normally closed contact 39c of the relay 39 and a normally closed contact 21 of the relay 21 are arranged in the line 42 which connects the terminals 41 of the evaluator with the normally open contact 9b of the relay 9. If the test button is operated or if the alarm device 21 responds, the "secure circuit" is opened by the contacts 39c or 21b, even if the signal stage 9 indicates the fulfillment of the measuring criterion and the normally open contact 9b is closed.

Figure 2:
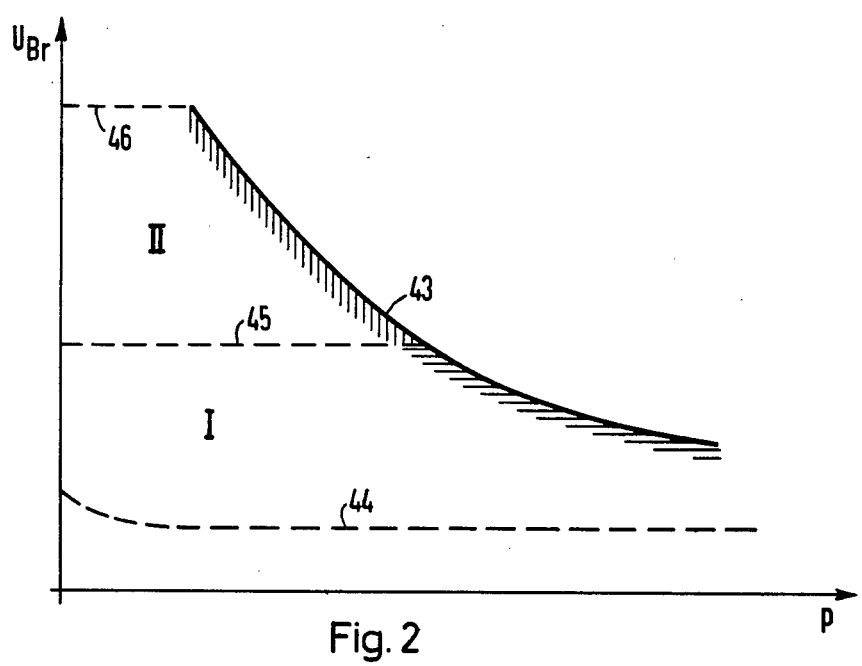
FIGS. 2 and 3 are diagrams helpful in understanding the operation of FIG. 1.

For the following explanation of the measuring principle reference is made to FIG. 2, in which the bridge output voltage $U_{Br}$ is plotted versus the pressure $p$ in the tank to be monitored, which is filled, for instance, with water. The curve 43 corresponds to the slope of the voltage which is given by the constant heating current predetermined by the reference value potentiometer 12. It is further assumed that as the measurement criterium, "Sensor in Liquid" is to be indicated. The position of the jumpers 28 and 40, which are shown in FIG. 1, corresponds to this assumption. If the resistors 1a to 1d of the resitance bridge 1 are at the same temperature the bridge is balanced and the bridge output voltage $U_{Br}$ is zero volts; this corresponds to the abscissa of FIG. 2. If the resistors 1a and 1b are immersed in the water and if the resistor 1a is heated by the heater resistance 3, then the heating power of the resistor 1a is largely removed by the liquid and only a small temperature and therefore, resistance difference exists between the resistors 1a and 1b. The bridge output voltage $U_{Br}$ therefore assumes a value which corresponds approximately to the curve 44. This voltage value is below the response threshold of the limit indicator 8 in the alarm range I given by the straight line 45. Because of the inverter stage 26 in the evaluating stage 10, a logical "1" signal is therefore present at the input terminal 29 of the logic circuit 30. Since the test button 31 is not operated, a logical "0" signal is present at the second input of the logic circuit 30 and a logical "1" signal is therewith present at the signal stage 9. The relay 9 energizes and the measuring signal is indicated internally and externally by the normally open contacts 9a and 9b. If the sensors 1a and 1b emerge from the water and are in a steam atmosphere, then the heating resistor 3 heats the resistor 1 because of the poor heat transfer in steam, and the temperature and therefore, resistance difference between the resistors 1a and 1b increases. As a result, the bridge output voltage $U_{Br}$ increases. If the bridge output voltage $U_{Br}$ exceeds the value given by the straight line 45 and if it is in the alarm region II, the limit indicator 8 responds and a logical "0" signal is present at the terminal 29 of the logic circuit 30 because of the inverter stage 26. Therewith, a logical "0" signal also appears at the signal stage 9, the relay is deenergized and there is not output indication given. This signifies that the measurement criterion is no longer fulfilled. In order to avoid a heating current which assumes an excessive high value for the heating resistor 3 with low pressure in the tank the measuring range II is limited by the straight line 46, the position of which is set by the response threshold of the limiter 17 for the heating current.

If it is assumed that as the measuring criterion "Sensor in Steam Atmosphere" is to be indicated, the jumper 28 must be disposed as shown in FIG. 1 by the dashed line. The binary signal derived from the bridge output voltage $U_{Br}$ by the limit indicator 8 is then fed directly to the input 29 of the logic circuit 30, which results in the same indication as described above.

With the level sensor described in the aforementioned literature reference it is customary to operate with two supply voltages of opposite polarity as well as with a positive and a negative measuring signal for the two measuring regions I and II. For this purpose, the resistance bridge is unbalanced by a supplemental resistor in the measuring equipment in such a manner that the bridge voltage with the sensors immersed is negative in the region I and becomes positive when the sensor emerges in the region II. The switch over point for differentiating between water and steam is at about zero volts. Because of the unbalancing resistor in the measuring equipment, the voltage drop $U_L = I_{Br}$ adds to or subtracts from the bridge voltage, $R_L$ being the resistance of the connecting lines between the measuring equipment and the bridge output. Therefore, an expensive adjustment or calibration at the site, is necessary with the known equipment in which the conductor length and thus, the resistance $R_L$ also enters into the bridge voltage. In addition this is affected by the supply of the bridge with variable d-c current.

The apparatus according to the present invention operates with a single, for instance, positive supply and operating voltage. The formation of the signal is therefore relocated into the positive voltage region, as shown in FIG. 2. The unbalancing resistance for the bridge is eliminated and the switch over voltage 45 is located between zero and the control point 46. Because the bridge is supplied from a constant current source the voltage drop in the connecting lines also does not influence the bridge voltage and therefore, does not affect the measuring signal. Special adjustments at the site of the installation, which take the length of the connecting lines and their resistances into consideration, are therefore eliminated. This facilitates the installation procedure substantially.

It was noted above that it is necessary to check that the operability of the level monitor manually or periodically to insure operational reliability of the system. In the prior art apparatus, such a testing arrangement is provided. With it the resistance bridge is unbalanced so that either a water signal or a steam signal is simulated. The functioning of the measuring sensors, however, cannot be checked. In the apparatus according to the invention the testing device also is operated by the test button 31 manually or periodically. However, in this test, the unbalancing of the bridge is accomplished by changing the current impressed by means of the constant current source 5 according to the relation $J_{Br} \sim U_{Sp} \sim U_{Br}$, where $J_{Br}$ is the bridge supply current, $U_{Sp}$ the resulting bridge supply voltage and $U_{Br}$ the bridge output voltage, and thus, the measuring signal. This variation of the impressed current is accomplished by means of the switching device 6, which includes double throw contact 39b of the relay 39. If an indication in the measuring region I is desired, i.e., the measuring criterion "Sensor in Water" is selected, then the jumper 40 is placed as shown in FIG. 1, an impressed current $I_{Br}$, which is only large enough that the bridge output voltage $U_{Br}$ is in the measuring region I is switched on. If the measuring criterion "Sensor in Steam Atmosphere" is set, then the jumper 40 is placed in accordance with the dashed line in FIG. 1. Upon operation of the test button 31 an impressed current $I_{Br}$, which causes a bridge output voltage $U_{Br}$ in the measuring region II is produced. The measuring signal for the test is indicated substantially as explained in detail above. In contrast to the known apparatus, not only the alarm and evaluation circuit is checked by the different current impression, but, because of the relation described above the sensors are also checked. Thus, a functional test which ensures operational reliability unequivocally is obtained.

Because of the sudden change of the bridge output voltage $U_{Br}$, particularly if the bridge voltage is lowered, overheating of the resistor 1a can come about during the testing, since the control arrangement strives to compensate a voltage reduction by more heating of the bridge. This danger exists particularly if the resistors 1a and 1b are normally in a stream atmosphere and, during the test, the measuring criterion "Sensor in Water" is to be indicated by lowering the voltage and this testing signal is allowed to be present very long.

In order to counteract this danger, the analog value storage device 14, which is connected to the summing junction 11 through the normally closed contact 39a, is arranged in the level monitor according to the present invention. Upon operation of the test button 31, the contact 39a opens and disconnects the analog value storage device from the summing junction 11 for the testing time. The signal which is stored in the analog value storage device and which determined the magnitude of the heating current prior to the test is now fed as the control signal to the control unit of the inverter 15 during the testing time. This control signal remains approximately constant during the testing time and overheating of the resistor 1a is thereby prevented.

Figure 3:
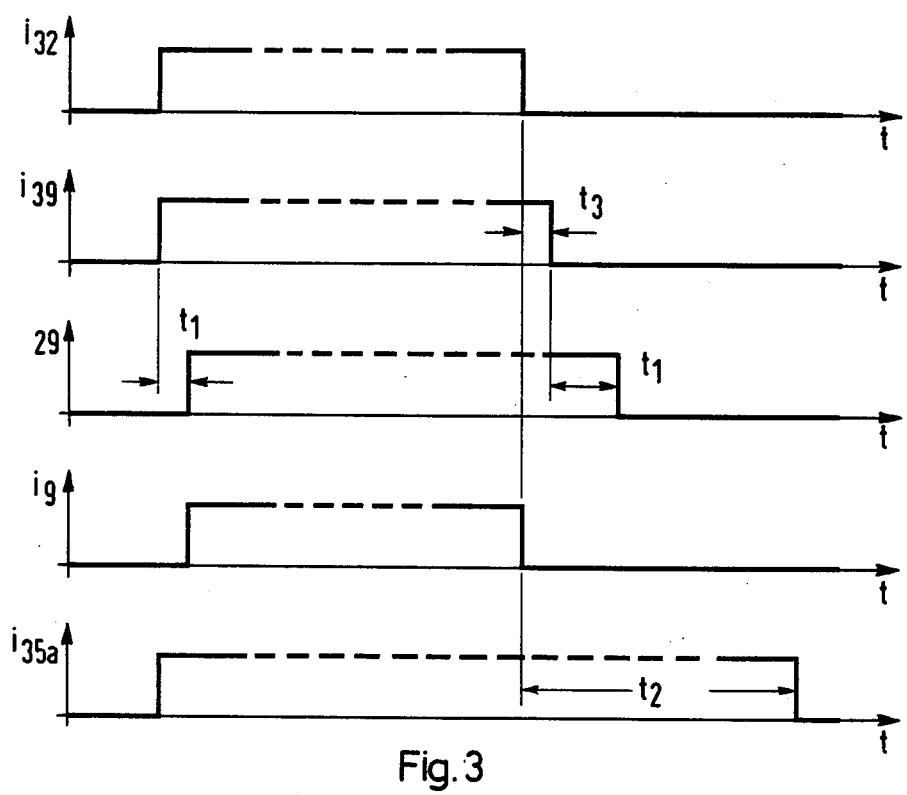

It was already mentioned that in the level monitor according to the present invention, an external indication in a "secure circuit" which is interrupted during the testing time by means of the contract 39b of the relay 39 in order to prevent a false external alarm is provided. To ensure that the measuring signal obtained in the test is not present prior to the opening of the "secure circuit" at the signal stage 9, the delay members 24, 37 and 38 are included. The delay member 24 delays the rising edge of a signal by the delay time $t_{1an}$ and the falling edge by the delay time $t_{1ab}$. The delay member 37 and 38 delay only the falling edge of an applied signal by the delay times $t_{2ab}$ and $t_{3ab}$, respectively. The effect of these components in the evaluator 10 will be explained with reference to FIG. 3, in which the signals $i_{35a}$, $i_9$, $i_{29}$, $i_{39}$ and $i_{32}$ which are present at the points or components of FIG. 1 identified by the corresponding reference symbols are plotted versus time.

If the test button is operated, the test signal $i_{32}$ is present during the entire testing time. The testing signal $i_{32}$ is present undelayed at one input of the AND gate 34 and at the inverting input 35a of the AND gate and cuts off the AND gate 35. Upon operation of the test button 31, the relay 39 is energized immediately by the pulse $i_{39}$ and the contact 39c opens the "secure circuit" and the double throw contact 39b switches to the impressed current required for the test. A measuring signal $i_{29}$ resulting from this current is present at the input 29 of the logic circuit 30, delayed by the delay time $t_{1an}$ of the delay member 24. This signal is coupled through AND gate 34 to the relay 9. Thus the relay 9 is energized by the signal $i_9$ which is delayed by the time interval $t_{1an}$. The normally open contacts 9b and 9a close, but the signal transmitter 33 indicates the test signal only internally. The delay of the measuring signal $i_{29}$ ensures that the contact 9b closes only after the "secure circuit" is already opened by the contact 39c.

If the test button is released, the AND gate 34 is disabled with the falling edge of the signal $i_{32}$ and the relay 9 deenergizes without delay causing the contacts 9b and 9a open immediately. Thereafter, the relay 39 deenergizes after the delay time $t_{3ab}$ and the contact 39c closes the "secure circuit" again. During this time, the test signal $i_{29}$ is still present at the input 29 of the logic circuit 30. It disappears only after the delay time $t_{1an}$. Now, the gate 35 is enabled again with the rear edge of the signal $i_{35a}$, delayed by the delay time $t_{2ab}$ and the apparatus can again also indicate a measuring signal in the external "secure circuit". With this time sequence the relay 9 deenergizes before the contact 39c closes the "secure circuit" and the gates 34 and 35 are disabled at the end of the testing time until it is certain that a test signal is no longer present at the terminal. A false alarm in the external circuit, caused by the test, is therefore precluded with certainty.

In summary, it can be said that, with the apparatus according to the present invention, installation at the site is substantially simplified, while the operational reliability is at the same time improved. In this connection, it should be emphasized that these advantages are accomplished without sacrificing safe operation and at almost no increase in cost.

What is claimed is:

1. In apparatus for monitoring the liquid level in a tank, which includes a resistance bridge supplied with DC current having two bridge arms arranged inside the tank with one of these bridge arms electrically heated, an output signal stage with an output indication in the form of a binary level, and a current regulator for the heating current of the heated bridge arm having the output of the resistance bridge as a control input, said apparatus including means for testing the operation of the monitoring device by simulating a given filling level, an improved means for testing comprising:
    a. a constant current source for supplying at least two DC currents of different magnitude;
    b. means for initiating testing;
    c. a switching device, having its control input coupled to said means for initiating testing, for selectively coupling one of the two currents of different magnitude to the resistance bridge;
    d. an analog value storage device interposed between the current regulator and the bridge; and
    e. means responsive to said means for initiating testing for interrupting the connection between the output of the resistance bridge and the current regulator when the testing device is operated.

2. Apparatus according to claim 1 wherein the signal stage is coupled to an external indicating device and further including means for disconnecting said external device when the testing device is operated.

3. Apparatus according to claim 1 and further including:
    a. a detector for determining the heating current;
    b. a limit indicator having its input coupled to the output of said detector; and
    c. an alarm device coupled to the output of said limit indicator.

4. Apparatus according to claim 3, wherein the current regulator for the heating current is an inverter and wherein said detector comprises a frequency to voltage converter.

5. Apparatus according to claim 1 and further including:
    a. a detector for determining the bridge supply voltage;
    b. a limit indicator having its output coupled to said detector; and
    c. an alarm device coupled to the output of said limit indicator.

6. Apparatus according to claim 5 and further including:
    a. a detector for determining the heating current;
    b. a limit indicator having its input coupled to the output of said detector; and
    c. an alarm device coupled to the output of said limit indicator.

7. Apparatus according to claim 6, wherein the current regulator for the heating current is an inverter and wherein said detector comprises a frequency to voltage converter.

8. Apparatus according to claim 7, and further including:
    a. an analog value storage device preceeding the current regulator having its input coupled to said bridge and its output coupled to said regulator; and
    b. means for interrupting the connection between the output of the resistance bridge and the current regulator when the testing device is operated.

9. Apparatus according to claim 8 wherein the signal stage is coupled to an external indicating device and further including means for disconnecting said external device when the testing device is operated.

* * * * *